US012675881B2

(12) United States Patent
Mermel et al.

(10) Patent No.: US 12,675,881 B2
(45) Date of Patent: Jul. 7, 2026

(54) SYSTEMS AND METHOD RECEIVING IMAGE PATCHES, AND DETERMINING TISSUE SAMPLE BIOMARKER STATUS IN DIGITIZED PATHOLOGY SAMPLES USING TRAINED MACHINE LEARNING MODEL

(71) Applicant: Verily Health Inc., Dallas, TX (US)

(72) Inventors: Craig Mermel, Los Gatos, CA (US); Po-Hsuan Chen, Palo Alto, CA (US); David F. Steiner, Mountain View, CA (US); Ronnachai Jaroensri, Mountain View, CA (US); Paul Gamble, Mountain View, CA (US); Fraser Tan, Mountain View, CA (US)

(73) Assignee: Verily Health Inc., Dallas, TX (US)

( * ) Notice: Subject to any disclaimer, the term of this patent is extended or adjusted under 35 U.S.C. 154(b) by 273 days.

(21) Appl. No.: 18/546,567

(22) PCT Filed: Feb. 11, 2022

(86) PCT No.: PCT/US2022/070623
§ 371 (c)(1),
(2) Date: Aug. 15, 2023

(87) PCT Pub. No.: WO2022/178497
PCT Pub. Date: Aug. 25, 2022

(65) Prior Publication Data
US 2024/0127444 A1 Apr. 18, 2024

Related U.S. Application Data

(60) Provisional application No. 63/149,914, filed on Feb. 16, 2021.

(51) Int. Cl.
*G06T 7/00* (2017.01)
*G06T 5/60* (2024.01)

(52) U.S. Cl.
CPC .............. *G06T 7/0012* (2013.01); *G06T 5/60* (2024.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 10,527,624 B2 * | 1/2020 | Dittamore | ........ | G01N 33/57555 |
| 2012/0219206 A1 * | 8/2012 | Janowczyk | ......... | G06F 18/2323 |
| | | | | 382/133 |

(Continued)

FOREIGN PATENT DOCUMENTS

WO          2020243545 A1      12/2020

OTHER PUBLICATIONS

Bejnordi, et al., "Context-Aware Stacked Convolutional Neural Networks for Classification of Breast Carcinomas in Whole-slide Histopathology Images", Journal of Medical Imaging, vol. 4, No. 4, Oct.-Dec. 2017, 9 pages.

(Continued)

*Primary Examiner* — Haris Sabah
(74) *Attorney, Agent, or Firm* — Kilpatrick Townsend & Stockton LLP

(57) ABSTRACT

One example method for biomarker detection in digitized pathology samples includes receiving a plurality of image patches corresponding to an image of a pathology slide having a hematoxylin and eosin-stained ("H&E") stained sample of tissue, each image patch representing a different portion of the image; for each image patch, determining, using a first trained machine learning ("ML") model, a patch biomarker status; and determining, using a second trained ML model, a tissue sample biomarker status for the sample of tissue based on the patch biomarker statuses of the image patches.

20 Claims, 7 Drawing Sheets

(56) References Cited

U.S. PATENT DOCUMENTS

| | | | |
|---|---|---|---|
| 2015/0004630 A1 | 1/2015 | Lange et al. | |
| 2015/0377865 A1 | 12/2015 | Acosta et al. | |
| 2016/0042511 A1 | 2/2016 | Chukka et al. | |
| 2016/0242742 A1 | 8/2016 | Gratacós Solsona et al. | |
| 2016/0299144 A1 | 10/2016 | Blume et al. | |
| 2017/0372471 A1* | 12/2017 | Eurèn | G06F 18/214 |
| 2020/0258223 A1* | 8/2020 | Yip | G06T 1/20 |

OTHER PUBLICATIONS

European Application No. 22757157.7, "Extended European Search Report", Nov. 20, 2024, 9 pages.

Li, et al., "Microvascularity Detection and Quantification in Glioma: A Novel Deep-Learning-based Framework", Laboratory Investigation, vol. 99, No. 10, Oct. 2019, pp. 1515-1526.

Courbet et al., "Detection of Pathological Biomarkers in Human Clinical Samples via Amplifying Genetic Switches and Logic Gates", Science Translational Medicine, vol. 7, No. 289, Available Online at: http://oww-files-public.s3.amazonaws.com/3/30/Courbet_STM.pdf, May 27, 2015, pp. 1-11.

International Application No. PCT/US2022/070623 , "International Search Report and Written Opinion", Apr. 1, 2022, 10 pages.

* cited by examiner

Image Patch
120

Image Patch
120n

Image of Slide with Stained
Tissue Sample
100

Image segmented into image
patches
110

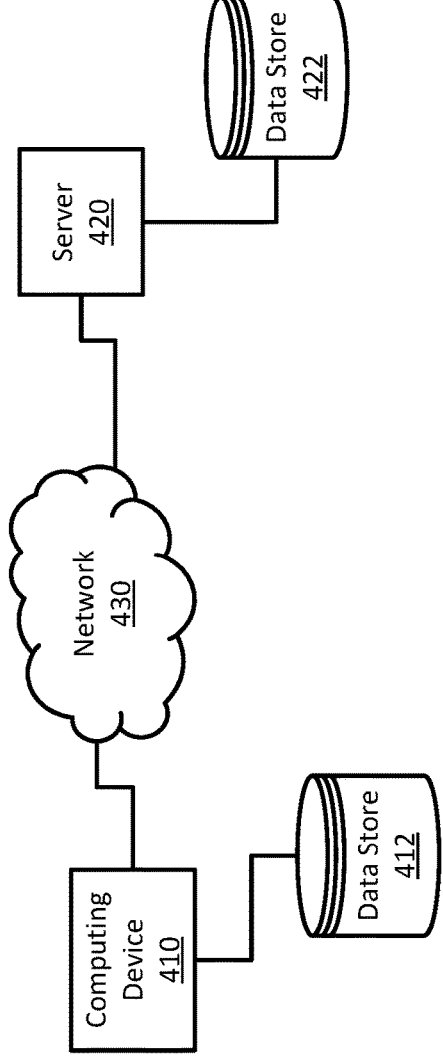
*FIG. 4*

600

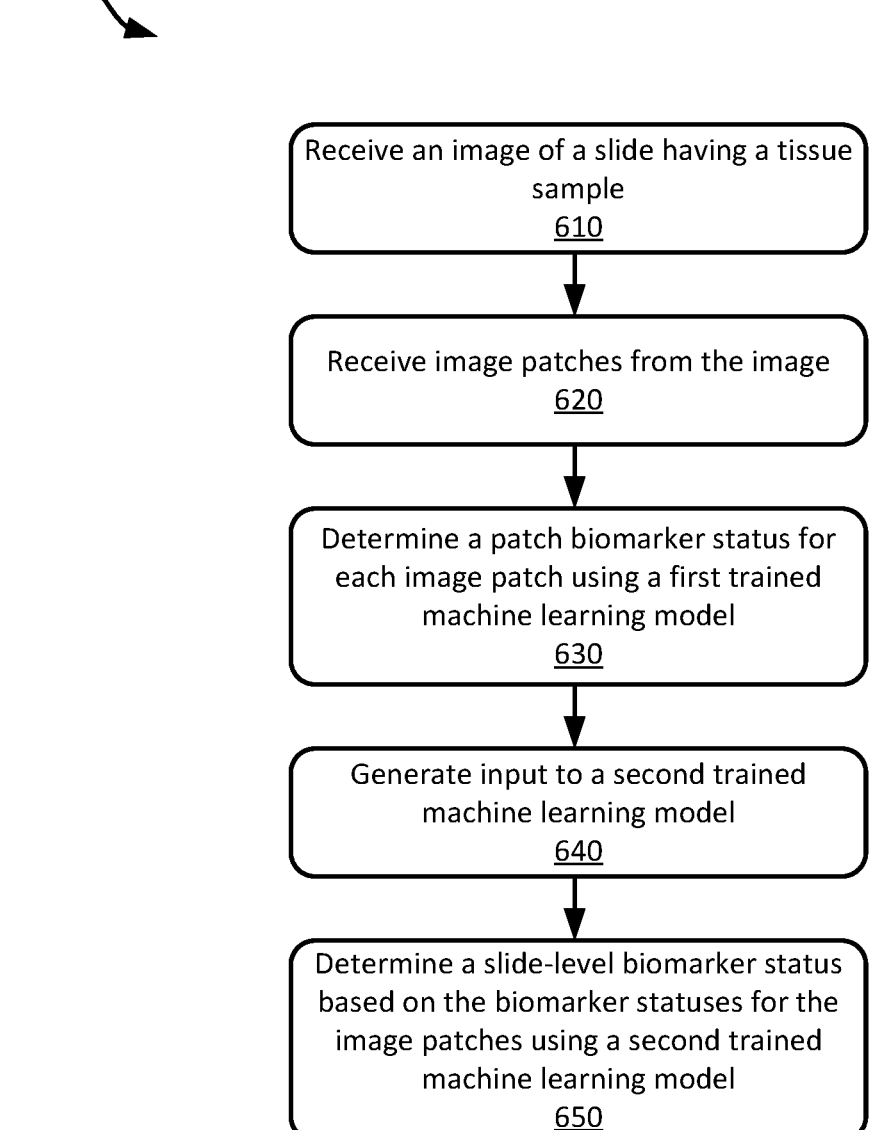

Receive an image of a slide having a tissue sample
610

Receive image patches from the image
620

Determine a patch biomarker status for each image patch using a first trained machine learning model
630

Generate input to a second trained machine learning model
640

Determine a slide-level biomarker status based on the biomarker statuses for the image patches using a second trained machine learning model
650

*FIG. 6*

SYSTEMS AND METHOD RECEIVING IMAGE PATCHES, AND DETERMINING TISSUE SAMPLE BIOMARKER STATUS IN DIGITIZED PATHOLOGY SAMPLES USING TRAINED MACHINE LEARNING MODEL

FIELD

The present application generally relates to biomarker detection in tissue samples and more particularly relates to systems and methods for biomarker detection in digitized pathology samples.

BACKGROUND

Interpretation of tissue samples to determine the presence of cancer requires substantial training and experience with identifying features that may indicate cancer. Typically a pathologist will receive a slide containing a slice of tissue and examine the tissue to identify features on the slide and determine whether those features likely indicate the presence of cancer, e.g., a tumor. In addition, the pathologist may also identify features, e.g., biomarkers, that may be used to diagnose a cancerous tumor, that may predict a risk for one or more types of cancer, or that may indicate a type of treatment that may be effective on a tumor.

SUMMARY

Various examples are described for systems and methods for biomarker detection in digitized pathology samples. One example method for biomarker detection in digitized pathology samples includes receiving a plurality of image patches corresponding to an image of a pathology slide having a hematoxylin and eosin-stained ("H&E") stained sample of tissue, each image patch representing a different portion of the image; for each image patch, determining, using a first trained machine learning ("ML") model, a patch biomarker status; and determining, using a second trained ML model, a tissue sample biomarker status for the sample of tissue based on the patch biomarker statuses of the image patches.

One example system includes a non-transitory computer-readable medium; and one or more processors communicatively coupled to the non-transitory computer-readable medium, the one or more processors configured to execute processor executable instructions stored in the non-transitory computer-readable medium configured to cause the one or more processors to receive a plurality of image patches corresponding to an image of a pathology slide having a hematoxylin and eosin-stained ("H&E") stained sample of breast tissue, each image patch representing a different portion of the image; for each image patch, determine, using a first trained machine learning ("ML") model, a patch biomarker status; and determine, using a second trained ML model, a tissue sample biomarker status for the sample of breast tissue based on the patch biomarker statuses of the image patches.

One example non-transitory computer-readable medium comprising processor-executable instructions configured to cause a processor to receive a plurality of image patches corresponding to an image of a pathology slide having a hematoxylin and eosin-stained ("H&E") stained sample of tissue, each image patch representing a different portion of the image; for each image patch, determine, using a first trained machine learning ("ML") model, a patch biomarker status; and determine, using a second trained ML model, a tissue sample biomarker status for the sample of tissue based on the patch biomarker statuses of the image patches.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 4 shows an example system for biomarker detection in digitized pathology samples;

FIG. 6 shows an example method for biomarker detection in digitized pathology samples.

DETAILED DESCRIPTION

Figure 1:
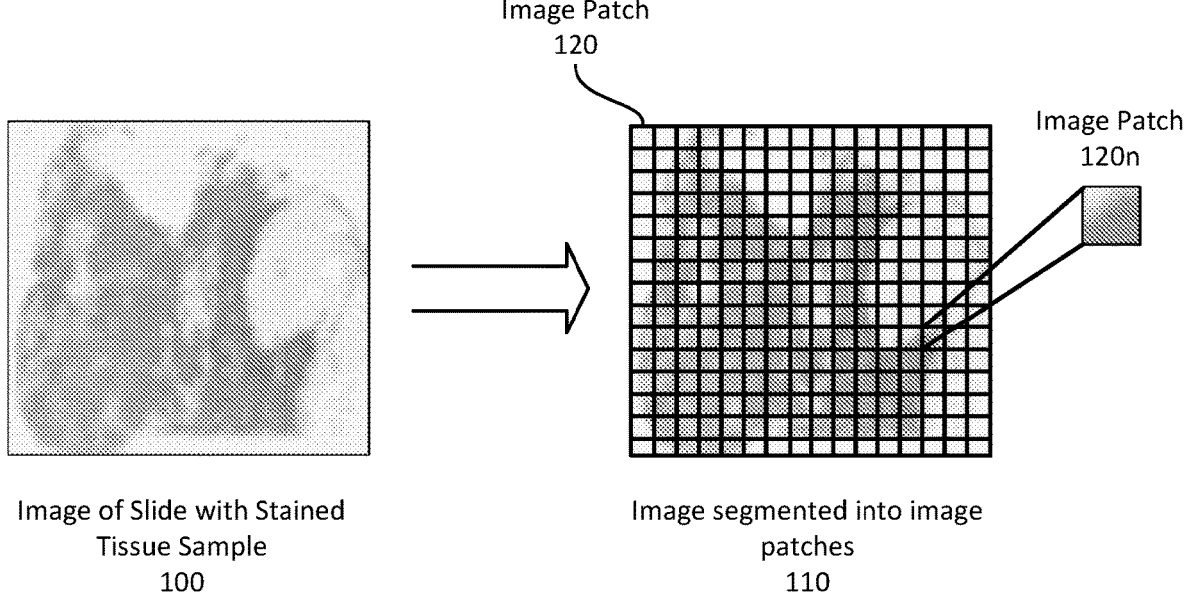
FIG. 1 shows an example of an image of a slide that includes a stained tissue sample suitable for use with systems and methods for biomarker detection in digitized pathology samples according to this disclosure.

Examples are described herein in the context of systems and methods for biomarker detection in digitized pathology samples. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Detection of biomarkers in pathology samples can be difficult and subject to interpretation by the pathologist reviewing the sample. For example, the detection process can involve immunohistochemistry ("IHC") staining the sample, which the pathologist then views in a magnified image of the sample, whether under a microscope directly or via a captured image of the sample. From the IHC-stained sample, the pathologist can identify features in the sample that indicate the presence (or absence) of particular biomarkers. IHC staining, however, can be substantially more expensive than other types of stains, e.g., hematoxylin and eosin ("H&E") staining. Further, IHC staining may not be readily available in all locales. To address this, this disclosure provides systems and methods to enable detecting certain biomarkers using other kinds of staining, such as H&E staining, which may not be typically used to identify certain biomarkers. More generally, the disclosure provides ways to train and use ML models to recognize biomarkers using stains that may be readily available or cost-effective in a particular locale, rather than a preferred stain for detecting a particular biomarker or biomarkers.

An example system for detecting biomarkers, e.g., biomarkers in stained tissue samples taken from a human breast, involves using trained machine learning ("ML") models to analyze a digitized image of the stained sample. To digitize the sample, a thin slice of tissue may be stained and positioned on a slide, where it is imaged, typically using optical magnification. The image of the stained tissue is then segmented into a number of image patches. Each of these image patches is inputted into one ML model, which analyzes the image patch to determine whether a particular biomarker is present. For example, the ML model may determine a likelihood of estrogen receptor ("ER") positivity or negativity in the image patch. Similarly another ML model may be used to determine the presence of other biomarkers, e.g., progesterone receptor ("PR") positivity or negativity or human epidermal growth factor receptor 2 ("HER2") positivity or negativity, in an image patch.

To train the model(s), a pathologist may be presented with an image of an IHC-stained tissue sample and the same tissue sample stained with an H&E stain. The pathologist can then indicate on the image of the H&E-stained tissue any locations corresponding to one or more biomarkers of interest that were located on the IHC-stained tissue. Thus, regions in the H&E-stained sample can be identified as corresponding to one or more biomarkers. The H&E-stained sample can then be segmented into patches and each patch can be assigned a label based on whether the patch falls within one of the identified regions or not. The labeled patches may then be fed into a suitable ML model to train it. In this example system, three different ML models have been trained: one trained to detect ER positivity/negativity, one trained to detect PR positivity/negativity, and one trained to detect HER2 positivity/negativity. Thus, each of the image patches may be presented to each of the three models, which then output information indicating whether the corresponding biomarker is likely present or not. For example, the model trained to detect ER positivity/negativity may output three values: a probability that the patch indicates ER positivity, a probability that the patch indicates ER negativity, and a probability that the patch indicates neither ER positivity or ER negativity. The other models output the same kind of information with respect to their respective biomarkers.

Once the various patches have been analyzed, the information from one of the ML models may then be fed into a further ML model to analyze the tissue sample as a whole. Based on the information about the various patches analyzed by the first ML model with respect to ER positivity/negativity, the second ML model can then determine whether the tissue sample is ER-positive or ER-negative. Similarly, the output from other two ML models, i.e., the PR and HER2 models discussed above, can be fed into subsequent ML models to determine whether the tissue sample is PR positive/negative or HER2 positive/negative. Using the outputs of these three ML models, a pathologist or other medical personnel can determine potential treatments that may be used for the corresponding patient.

Training of these second stage models may be accomplished in a similar way as discussed above. A pathologist, in addition to identifying regions of biomarker positivity or negativity, can also identify whether the tissue samples as a whole are biomarker positive or negative. The information determined from the various patches can then be labeled and provided to the ML model. By repeating this process with multiple different tissue samples, the ML model can be trained to recognize whether a slide indicates biomarker positivity or negativity based on the biomarker analysis of the image patches.

Such a technique may enable the use of cheaper, more readily available stains to identify biomarkers in cancerous tissue. While the example above used IHC and H&E as example stains, other stains may be used depending on the type of tissue involved, the types of biomarkers to be identified, and the types of stains likely to be available. Examples according to this disclosure may also enable identification of biomarkers in cancerous tissue with little inter-pathologist variability and using staining techniques not otherwise used to identify biomarkers. While a pathologist may ultimately review the output of the system to confirm its determinations, or the pathologist may review the output as a check on their own analysis, once the system has gained the confidence of medical personnel, it may be used to determine the presence (or absence) of certain biomarkers and treat the patient accordingly.

This illustrative example is given to introduce the reader to the general subject matter discussed herein and the disclosure is not limited to this example. The following sections describe various additional non-limiting examples and examples of systems and methods for biomarker detection in digitized pathology samples.

Referring now to FIG. 1, FIG. 1 shows an example of an image of a slide that includes a stained tissue sample. In a clinical setting, a pathologist may review a slide having a stained tissue sample to determine whether a particular biomarker is present or not in the sample. For example, diagnostic workup and treatment of breast cancer depends on clinical biomarkers, most prominently ER, PR, and HER2. In current clinical practice, biomarker status is typically determined by histological inspection of the stained tissue, as discussed above. Upon microscopic examination of IHC-stained slides, experts can frequently determine the biomarker status of each sample. However, IHC staining can be expensive and is not always readily available. Thus, performing such an analysis using other kinds of stains, such as H&E stain, would be desirable. The example image of the slide shown in FIG. 1 has been H&E-stained and is further processed for use by systems and methods according to this disclosure.

Because H&E staining (as well as other types of staining) is not used to detect biomarkers in breast cancer tissue, systems and methods according to this disclosure have been developed to accept images of stained tissue samples and determine whether or not a particular biomarker is present using a stain of interest. In some cases the stains may be of any kind that is not IHC, though in some examples, the system may be trained to analyze IHC-stained tissue. Example systems, such as those depicted in FIGS. 2 and 3, employ ML to recognize the presence of biomarkers in such a tissue sample.

To begin the process, an image of a stained tissue sample may be captured using any suitable imaging device at a suitable level of detail or resolution. The example image 100 in FIG. 1 was captured at a resolution of approximately 2 microns per pixel. However, it should be appreciated that any suitable size or resolution may be employed.

Once an image 100 of a tissue sample has been obtained, the system segments the image 100 into a number of image patches 120, e.g., image patch 120n. In this example, the image 100 has been segmented into 512×512-pixel patches (not to scale), representing approximately 1 square millimeter patches; however any suitable size or number of patches may be used.

Figure 2:
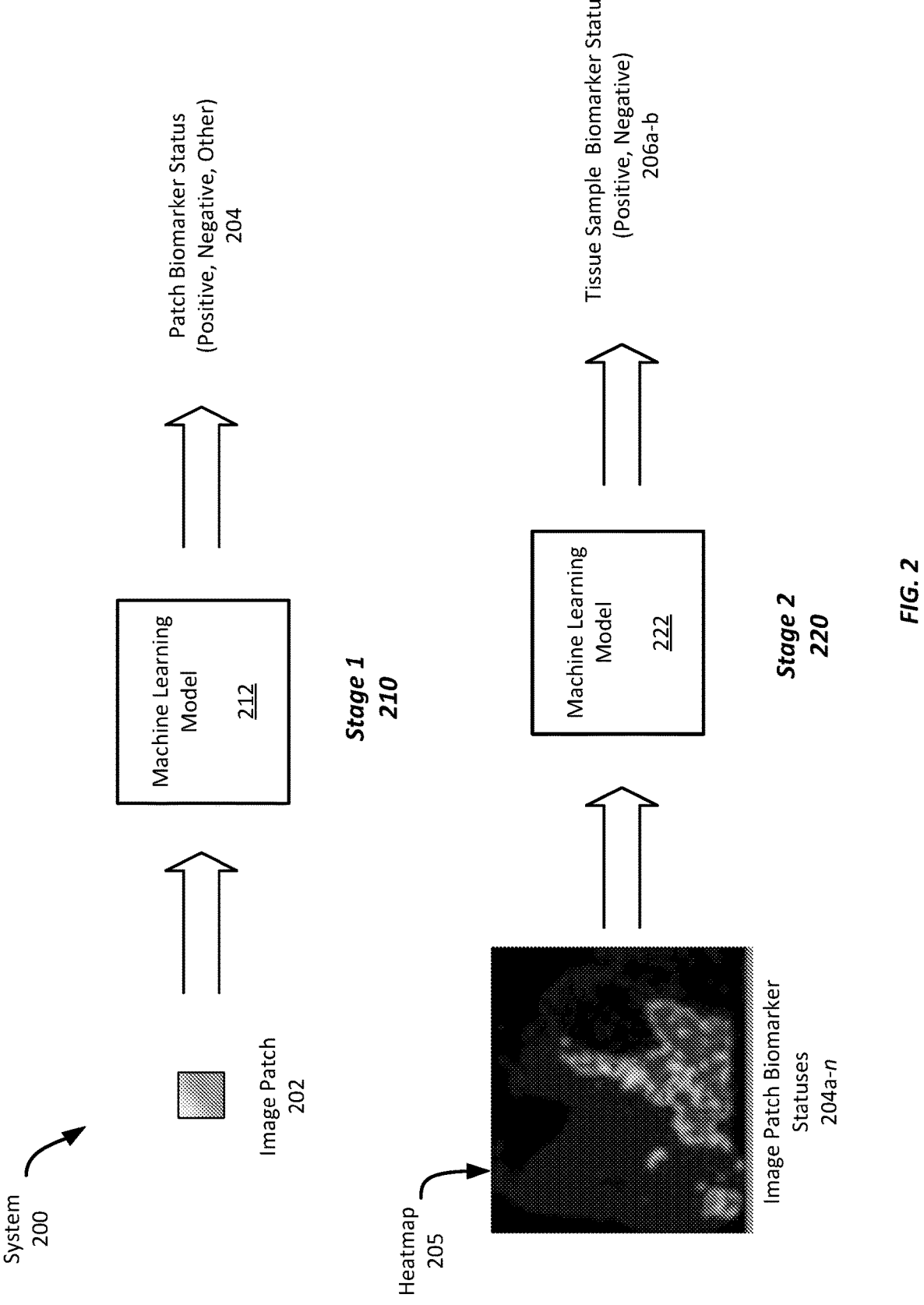
FIG. 2 shows an example system for biomarker detection in digitized pathology samples.

Referring now to FIG. 2, FIG. 2 shows an example system 200 for systems and methods for biomarker detection in digitized pathology samples. The system 200 shown in FIG. 2 includes two stages 210, 220. Stage 1 (210) includes a trained ML model 212 that accepts image patches, such as discussed above with respect to FIG. 1, as input and outputs a biomarker status for the image patch.

The ML model in this example has been trained using image patches and corresponding training labels indicating a biomarker presence or absence. To obtain the training image patches images of slides with conventional IHC-stained breast cancer tissue samples were obtained. The same tissue sample was washed off the IHC stain, re-stained with a desired stain, e.g., H&E stain, and imaged. A pathologist was then presented with images of both the IHC-stained sample and the H&E-stained sample and identified regions in the H&E-stained sample that indicated biomarker positivity or negativity, based on reviewing the IHC-stained sample. The image of the H&E-stained tissue was then segmented into image patches, and the image patches were then labeled based on being within or outside of the identified regions. The first ML model in the example system 200 was trained using 1.21 billion patches from 576 slides across 200 cases, and evaluated on a test set of all patches from 181 slides across 64 cases, while the second ML model was trained using 2134 slides from 264 cases, and evaluated on a test set containing a total of 3274 slides from 1249 cases. However, any suitable training sets may be employed.

Any suitable ML models may be used according to different examples. The example system 200 shown in FIG. 2 uses two deep convolutional neural networks ("CNNs"); however, other ML models such as a residual neural network ("Resnet") or NASNET provided by GOOGLE LLC from MOUNTAIN VIEW, CALIFORNIA, or a recurrent neural network, e.g. long short-term memory ("LSTM") models or gated recurrent units ("GRUs") models. The ML models 212, 222 can also be any other suitable ML model, such as a three-dimensional CNN ("3DCNN"), a dynamic time warping ("DTW") technique, a hidden Markov model ("HMM"), etc., or combinations of one or more of such techniques—e.g., CNN-HMM or MCNN (Multi-Scale Convolutional Neural Network). Further, some examples may employ adversarial networks, such as generative adversarial networks ("GANs"), or may employ autoencoders ("AEs") in conjunction with ML models, such as AEGANs or variational AEGANs ("VAEGANs"). Further, the two stages 210, 220 may employ the same or different types of ML models.

As discussed above, the ML model 212 accepts image patches 202 as input and outputs a corresponding biomarker status for each image patch 202. The biomarker status in this example includes a tuple having three distinct values: a probability indicating biomarker positivity, a probability indicating biomarker negativity, and a probability indicating the patch shows non-invasive carcinoma (identified as "other" in the Figure). These probabilities sum to 100% or 1 (on a 0-1 scale), notwithstanding any rounding or floating point imprecision. Thus, the ML model outputs a tuple for each of the patches segmented from an image. These tuples may be visualized as being components of three different "heatmaps," each representing one of the distinct values: one each for biomarker positivity, biomarker negativity, and "other." An example of such a heatmap 205 is shown in FIG. 2 and represents the values corresponding to one of the three tuple values for all of the image patches 204a-n. The heatmap 205 here indicates biomarker negativity, with low probabilities of biomarker negativity being represented by blue (or black, in grayscale) regions and high probabilities of biomarker negativity being represented by red (or grey, in greyscale). The other two heatmaps are not depicted, but provide a visualization of those values in a similar way.

Stage 2 (220) accepts the output of stage 1 (210) and determines an image-level (or "slide-level") probability of biomarker positivity and negativity. Training of ML model 222 in stage 2 in this example is performed based on IHC-stained slides that have been examined and labeled by a pathologist, followed by washing the stain from the tissue, and re-staining using the desired stain, e.g., H&E stain, generally as discussed above. The results of stage 1 (210) can then be presented to the ML model 222 along with the corresponding label. Once a suitable number of training slides have been applied to the ML model 222, or once the accuracy of the output meets a pre-determined threshold, the ML model 222 may be used as a part of stage 2 (220). It should be appreciated that training an ML model may be performed using any suitable staining technique. The use of IHC and H&E stains in this example is illustrative.

In this example system 200, the ML model 222 in stage 2 (220) does not use the heatmap 205 from stage 1 (210), but rather, the patch biomarker statuses 204 are bucketized into histograms, which are provided as input to the stage 2 (220) ML model 222.

Figure 3:
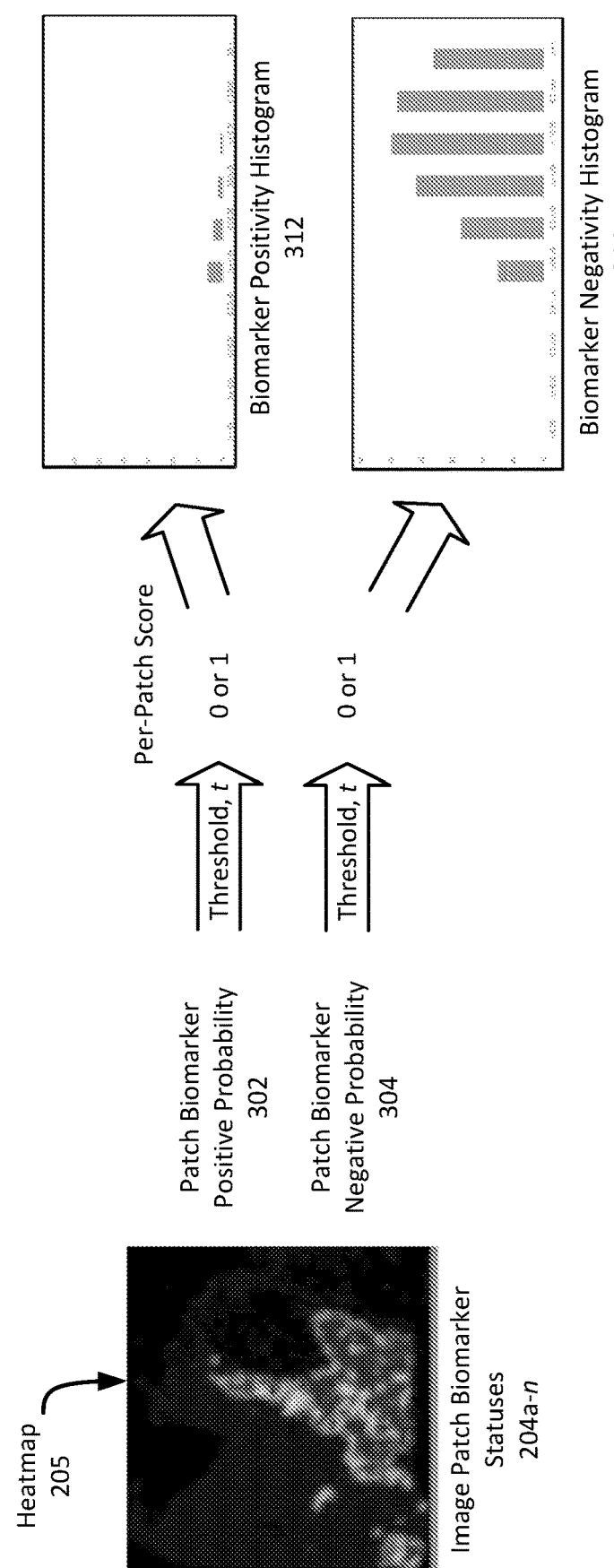
FIG. 3 shows an example data flow to generate a set of histograms from patch biomarker statuses suitable for use with systems and methods for biomarker detection in digitized pathology samples.

Referring now to FIG. 3, FIG. 3 shows an example data flow to generate a set of histograms from patch biomarker statuses. As discussed above, stage 1 (210) outputs a heatmap of per-patch biomarker statuses, with each patch represented by a triplet of values: (biomarker positivity, biomarker negativity, other). To generate the heatmaps 312, 314, the biomarker status for each patch, whether positive or negative, is compared against a threshold value, t. If the patch biomarker status meets or exceeds, t, it is assigned a value of 1, otherwise it is assigned a value of 0. Buckets for the biomarker positivity and biomarker negativity histograms are created using equally sized probability ranges, e.g., having a width of 5%, 10%, or any suitable width. Each patch is then assigned to a bucket in each histogram based on the respective probability of biomarker positivity or negativity, respectively.

Each patch's contribution to the respective bucket is based on whether that patch's probability meets or exceeds t, as discussed above. In this example, t=0.42. Thus, if patch 1 has patch biomarker status of (0.57, 0.22, 0.21), it is assigned values of (1, 0, 0) based on t. Its binary values then are added to the histogram bucket corresponding to the patch biomarker status probabilities. In this example, the histogram employs buckets with 10% width. Thus, patch 1 contributes 1 to bucket 0.5-0.59 in the biomarker positivity histogram 312 and 0 to bucket 0.2-0.29 in the biomarker negativity bucket. Each patch is similarly bucketed and contributes to the two histograms 312, 314. A side effect of using the threshold, t, in this example, is that the histograms for the ranges 0-0.09, 0.1-0.19, 0.2-0.29, and 0.3-0.39 are all zero.

It should be appreciated that the data flow discussed above is only one example. Any suitable approach may be used to generate a suitable histogram for the stage 2 (220)

ML model. For example, while this example a threshold, t, was used in this example, some examples may not employ such a threshold. Further, while the same threshold was used for both biomarker positivity and negativity, it should be appreciated that different thresholds may be used in some examples. Similarly, the bucket widths may be of any suitable size and, in some examples, may not be equal widths.

Referring again to FIG. 2, in this example, the patch biomarker statuses 204*a-n* are bucketized to generate a histogram, which may provide a more compact representation of the patch biomarker statuses. However, it should be appreciated that any suitable representation of the patch biomarker statuses may be employed. For example, the full resolution heatmap may be provided to the stage 2 (220) ML model 222 in some examples. Alternatively, other approaches to parameterizing the ML model output may be used according to some examples.

After the patch biomarker statuses 204*a-n*, as represented by the histograms 312, 314 in FIG. 3, have been input into the ML model 222, the ML model 222 generates probabilities of biomarker positivity and biomarker negativity 206*a-b*. These two probabilities may then be used to determine whether the tissue sample is biomarker positive, biomarker negative, or other. For example, the system 200 may compare the two probabilities 206*a-b* and select the higher probability as indicating the biomarker status for the tissue sample. In some examples, the system 200 may compare the two probabilities to a threshold and, if one of the probabilities 206*a-b* meets or exceeds the threshold, the system 200 may identify the tissue sample as biomarker positive or negative, depending on which biomarker met the threshold. Alternatively, if neither biomarker probability meets the threshold, the system 200 may output that neither biomarker is detected.

Referring now to FIG. 4, FIG. 4 shows an example system 400 for biomarker detection in digitized pathology samples. The example system 400 includes a computing device 410 that has access to a data store 412 and is connected to server 420 and its data store 422 via network 430. In this example, the computing device 410 accesses digitized pathology samples from data store 412 and provides them to the server 420 for analysis, such as using the system 200 described above with respect to FIG. 2 or the system 500 described below with respect to FIG. 5. After completing the analysis, the server 420 returns the results to the computing device 410 or stores them in data store 422 for later retrieval, e.g., by medical personnel.

In this example, the server 420 is maintained by a medical provider, e.g., a hospital or laboratory, while the computing device 410 is resident at a medical office, e.g., in a pathologist's office. Thus, such a system 400 may enable medical providers at remote locations to obtain and stain tissue samples with available and cost-effective stains, and provide those samples to a remote server 420 that can provide the analysis of the samples. However, it should be appreciated that example systems according to this disclosure may only include computing device 410, which may perform the analysis itself without communicating with a remote computing device.

To implement systems according to this example system 400, any suitable computing device may be employed for computing device 410 or server 420. Further, while the computing device 410 in this example accesses digitized pathology samples from the data store 412, in some examples, the computing device 410 may be in communication with an imaging device that captures images of pathology samples. Such a configuration may enable the computing device to capture an image of a pathology sample and immediately process it using suitable ML models, or provide it to a remote computing device, e.g., server 420, for analysis.

Figure 5:
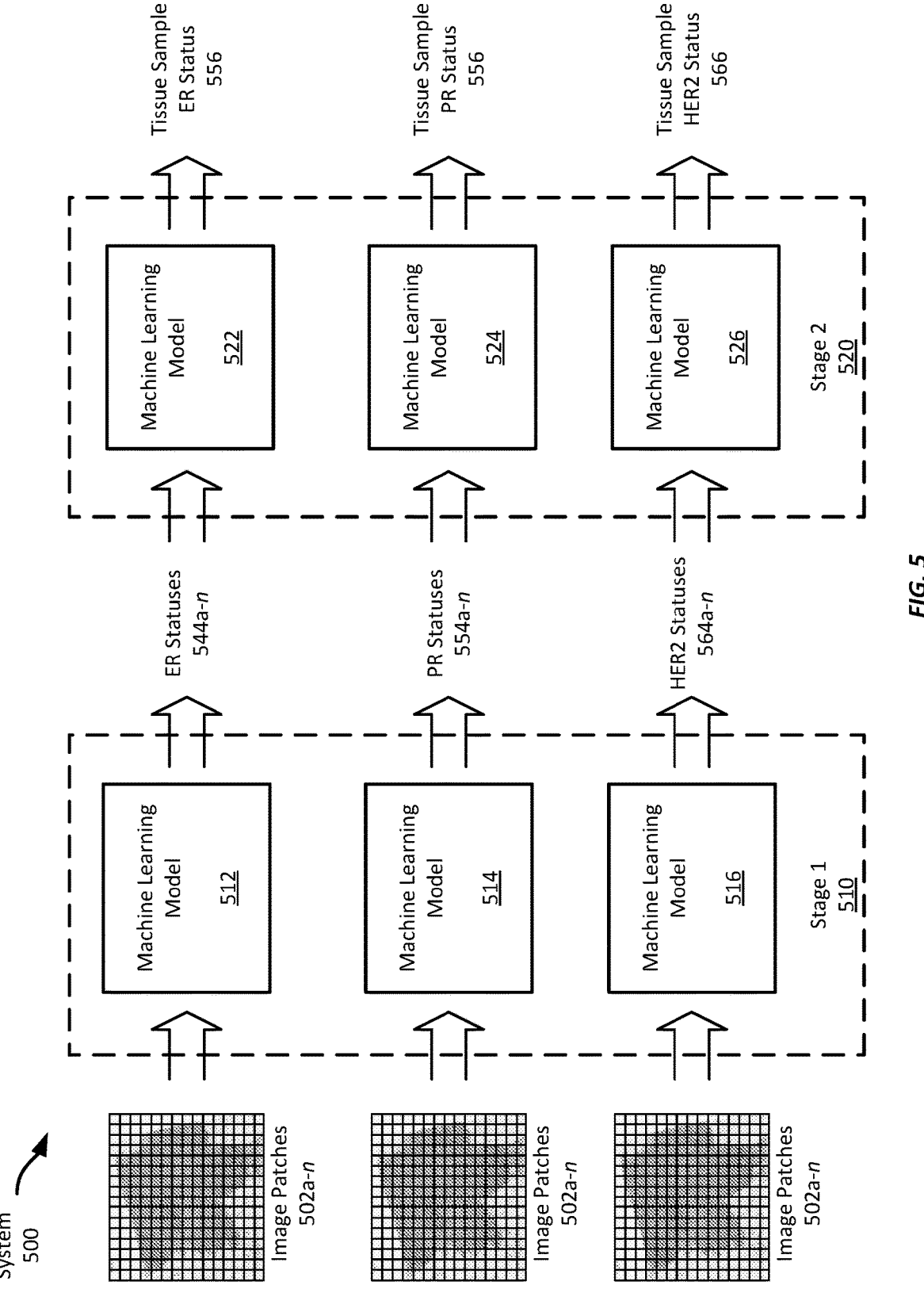
FIG. 5 shows an example system for biomarker detection in digitized pathology samples.

Referring now to FIG. 5, FIG. 5 shows an example system 500 for biomarker detection in digitized pathology samples. In this example, the system 500 includes two stages 510, 520, similar to the example system 200 shown in FIG. 2. However, in this example, each stage 510, 520 includes three ML models 512-516, 522-526. Each stage 1 model 512-516 has been trained to recognize a different biomarker: model 512 has been trained to determine ER positivity or negativity, model 514 has been trained to determine PR positivity or negativity, and model 516 has been trained to determine HER2 positivity or negativity. Further, each has a corresponding model 522-526 in stage 2 (520) that has been trained to determine a biomarker status for the full tissue sample: ML model 522 has been trained to detect slide-level ER positivity or negativity; ML model 524 has been trained to detect slide-level PR positivity or negativity, and ML model 526 has been trained to detect slide-level HER2 positivity or negativity.

In the example shown, an image of a stained tissue sample, e.g., an H&E-stained tissue sample, is segmented into multiple image patches 502*a-n* and copies of each image patch are provided to each ML model 512-516 in stage 1 (510). The ML models 512-516 evaluate each patch 502*a-n* for the respective biomarker positivity, biomarker negativity, or other, and output corresponding patch biomarker statuses: ER statuses 544*a-n*, PR statuses 554*a-n*, and HER2 statuses 564*a-n*. As discussed above with respect to FIG. 2, the biomarker statuses may be visualized as heatmaps. In this example system 500, the biomarker statuses are processed to generate corresponding histograms, two each for ER positivity/negativity, PR positivity/negativity, and HER2 positivity/negativity. However, as discussed above, any suitable input format may be used for the stage 2 ML models 522-526.

The generated histograms are input into the corresponding ML model 522-526 in stage 2 (520). The ML models 522-526 determine a slide-level biomarker positivity or negativity, which are output as tissue sample biomarker status 546-566. In this example, the ML models 522-526 output each output two probabilities: one indicating biomarker positivity and the other indicating biomarker negativity. Some examples further determine a slide-level biomarker status based on the probabilities output by a respective ML model 522-526. For example, the system 500 may determine the slide-level biomarker status by selecting the greater of the probabilities of biomarker positivity or biomarker negativity. In some examples, the system 500 may determine the slide-level biomarker status by determining whether one of the slide-level biomarker status probabilities exceeds a threshold. Further, in some examples, the system 500 may determine that no biomarker is present, or biomarker status is inconclusive, if neither slide-level biomarker status meets a threshold probability or if both meet the threshold probability.

The example system 500 shown in FIG. 5 employs three different biomarker analyses running in parallel to assess three different biomarkers (ER, PR, and HER2) for a single stained breast cancer tissue sample. Thus, the system 500 is capable of outputting indicators of each biomarker status to a clinician, who can then determine a course of treatment for the patient. Alternatively, a pathologist may use the system 500 to double check their own analysis or to provide an initial assessment of a tissue sample before performing an analysis of an IHC-stained tissue sample from the same patient. However, in scenarios where IHC staining may be in limited supply, unavailable, or too costly, the system 500 may be able to provide biomarker status using more conventionally available and typically cheaper H&E staining.

Referring now to FIG. 6, FIG. 6 shows an example method 600 for biomarker detection in digitized pathology samples. This example method will be described with respect to the system 500 shown in FIG. 5; however, any suitable system, such as the system 200 shown in FIG. 2, may be employed.

At block 610, the system 500 receives an image of a slide having a tissue sample. In this example, the system 500 receives an image of a slide having an H&E-stained breast cancer tissue sample, though in some examples, any suitable stain may be employed. Further, it should be appreciated that while breast cancer tissue is used in this example, any suitable tissue sample may be used in some examples.

In this example, the system 500 receives the image of the tissue sample from a memory device that has a copy of the image stored in it. However, in some examples, the system 500 may receive the image from an imaging device or from a remote computing device, such as a computing device at a medical provider. In one such example, the system 500 may be executed by a server remote from the medical provider, such as in a cloud environment, e.g., as shown in FIG. 4. Upon completing the method 600, the system 500 may provide the results to the medical provider, such as over a communications network, e.g., a local area network (LAN), a wide-area network (WAN), the internet, etc.

At block 620, the system 500 receives a plurality of image patches corresponding to the image, where each image patch represents a different portion of the image. In this example, the entire image has been segmented into image patches, 502*a-n* though in some examples, portions of the image may not be segmented. For example, portions of the image lacking a threshold level of staining, e.g., pixels with a color indicating no to little staining present, may not be segmented, or pixels identified as falling outside a boundary of the tissue sample may be excluded. In this example, the image has a resolution of approximately 2 microns per pixel with image patches having a size of approximately 512×512 pixels, though any suitable resolution or any suitable image size or image patch size may be employed.

At block 630, the system 500 determines, for each image patch, a patch biomarker status using a first trained ML model 512. As discussed above with respect to FIG. 5, ML model 512 has been trained to detect ER positivity or negativity (or not-invasive-carcinoma) for image patches. Thus, in this example, the ML model outputs three values for each image patch: a probability of ER positivity, a probability of ER negativity, and a probability of not-invasive carcinoma. It should be appreciated, however, that in some examples, the ML model 512 may only output two values: a probability of biomarker positivity and a probability of biomarker negativity. Further, some examples, may only output a single value indicating which indicator had a higher probability: biomarker positivity or negativity, or in some cases, an indicator if neither probability met a predetermined threshold.

In this example method 600, only a single biomarker is analyzed for an image patch; however, it should be appreciated that multiple different biomarkers may be determined for each patch by using multiple trained ML models, such as ML models 512-516. These may be run in parallel or in series (or a combination). Further, in some examples, a single ML model may be trained to recognize biomarker positivity/negativity for multiple different biomarkers. In systems using such ML models, fewer ML models may be used, though any combination or number of ML models may be used according to the biomarkers to be detected for a particular tissue sample.

At block 640, the system 500 generates an input to a second trained ML model 522. In this example, the system 500 generates a histogram using the patch biomarker statuses output by the first ML model 512, generally as described above with respect to the examples discussed with respect to FIG. 3. However in some examples, the system 500 may provide the output from the first ML model 522 to the input of the second trained ML model 522 without separately generating an input to the second trained ML model 522, or by using a different parameterization technique.

At block 650, the system 500 determines a tissue sample biomarker status for the sample of breast tissue based on the patch biomarker statuses of the image patches using a second trained ML model 522. As discussed above with respect to FIGS. 2 and 5, the second trained ML model 522 has been trained to determine slide-level biomarker status and outputs two values, one each indicating a probability of biomarker positivity and biomarker negativity. In some examples, the system 500 may further determine a single slide-level biomarker status based on the probabilities of biomarker positivity and negativity. For example, the system 500 may compare the two probabilities and identify the larger probability as indicating the biomarker status of the tissue sample. In some examples, the system 500 may compare the two probabilities to a threshold value and, if one of the probabilities meets the threshold, determine the biomarker status as corresponding to that biomarker. Further, if neither probability meets the threshold, the system 500 may determine that the biomarker status is not invasive carcinoma or, if both meet the threshold, it may determine that the biomarker status is inconclusive.

It should be appreciated that the method 600 described above may be run multiple times for a single image of a tissue sample. For example, the system 500 shown in FIG. 5 may perform the method 600 three times, corresponding to the three different sets of ML models 512/522, 514/524, 516/526 in FIG. 5, one for each biomarker to be evaluated. Further, these different executions of the method 600 may be executed in parallel or serially according to different examples.

Figure 7:
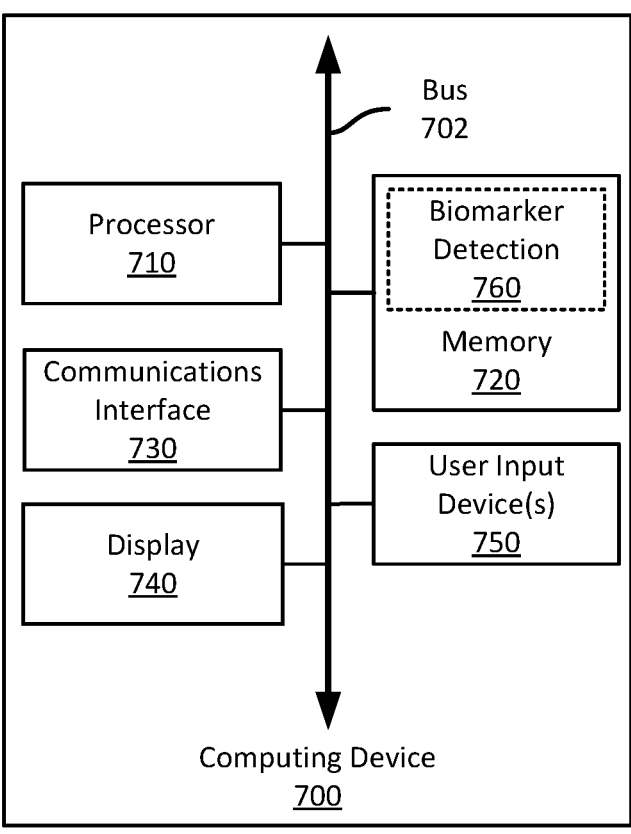
FIG. 7 shows an example computing device suitable for use with various systems and methods for biomarker detection in digitized pathology samples.

Referring now to FIG. 7, FIG. 7 shows an example computing device 700 suitable for use in example systems or methods for biomarker detection in digitized pathology samples according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for biomarker detection in digitized pathology samples according to different examples, such as part or all of the example method 600 described above with respect to FIG. 6. In this example, the memory 720 includes a biomarker detection system 760, such as the example system shown in FIG. 2 or FIG. 5. In addition, the computing device 700 also includes one or more user input devices 750, such as a keyboard, mouse, touchscreen, microphone, etc., to accept user input; however, in some examples, the computing device 700 may lack such user input devices, such as remote servers or cloud servers. The computing device 700 also includes a display 740 to provide visual output to a user.

The computing device 700 also includes a communications interface 740. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure.

The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving a plurality of image patches corresponding to an image of a pathology slide having a hematoxylin and eosin-stained ("H&E") stained sample of tissue, each image patch representing a different portion of the image;
for each image patch, determining, using a first trained machine learning ("ML") model, a patch biomarker status;
for each patch biomarker status, comparing the respective patch biomarker status to a threshold,
responsive to determining that the respective patch biomarker status for biomarker positivity satisfies the threshold, determining the patch biomarker status as comprising biomarker positive;
responsive to determining that the respective patch biomarker status for biomarker negativity satisfies the threshold, determining the patch biomarker status as comprising biomarker negative; and
determining, using a second trained ML model, a tissue sample biomarker status for the sample of tissue based on the patch biomarker statuses of the image patches.

2. The method of claim 1, wherein:
the patch biomarker status comprises one or more of estrogen receptor ("ER") positive, ER negative, progesterone receptor ("PR") positive, PR negative, human epidermal growth factor receptor 2 ("HER2") positive, HER2 negative, or not invasive carcinoma, and
the tissue sample biomarker status comprising one or more of ER positive, ER negative, PR positive, PR negative, HER2 positive, HER2 negative, or not invasive carcinoma.

3. The method of claim 1, wherein the patch biomarker status is a first patch biomarker status and the tissue sample biomarker status is a first tissue sample biomarker status, and further comprising:
for each image patch, determining, using a third trained ML model, a second patch biomarker status;
determining, using a fourth trained ML model, a second tissue sample biomarker status for the sample of tissue based on the second patch biomarker statuses of the image patches;
for each image patch, determining, using a fifth trained ML model, a third patch biomarker status; and
determining, using a sixth trained ML model, a third tissue sample biomarker status for the sample of tissue based on the third patch biomarker statuses of the image patches.

4. The method of claim 3, wherein:

the first patch biomarker status comprises one of estrogen receptor ("ER") positive, ER negative, or not invasive carcinoma, the first tissue sample biomarker status comprises an ER positive status, an ER negative status, and a not invasive carcinoma status, the second patch biomarker status comprises a progesterone receptor ("PR") positive status, a PR negative status, and a not invasive carcinoma status, the second tissue sample biomarker status comprises one or more of a PR positive status, a PR negative status, or a not invasive carcinoma status, the third patch biomarker status comprises a human epidermal growth factor receptor 2 ("HER2") positive status, a HER2 negative status, and a not invasive carcinoma status, the third tissue sample biomarker status comprises one or more of a HER2 positive status, a HER2 negative status, or a not invasive carcinoma status.

5. The method of claim 1, further comprising generating one or more histograms based on the patch biomarker statuses of the image patches, and wherein determining, using the second trained ML model, the tissue sample biomarker status for the sample of tissue is based on the one or more histograms.

6. The method of claim 1, wherein each patch biomarker status comprises a probability between 0% and 100%, inclusive, corresponding to a biomarker.

7. The method of claim 1, wherein the tissue sample biomarker status for the sample of tissue comprises a probability between 0% and 100%, inclusive, corresponding to a biomarker.

8. The method of claim 1, wherein the threshold is t;

responsive to determining a respective patch biomarker status for biomarker positivity is greater than or equal to t, determining the patch biomarker status as comprising biomarker positive;

responsive to determining a respective patch biomarker status for biomarker negativity is greater than or equal to t, determining the patch biomarker status as comprising biomarker negative; and responsive to determining that a respective patch biomarker status for biomarker positivity is less than t and that the respective patch biomarker status for biomarker negativity is less than t, determining the patch biomarker status as comprising not invasive carcinoma.

9. A system comprising:

a non-transitory computer-readable medium; and one or more processors communicatively coupled to the non-transitory computer-readable medium, the one or more processors configured to execute processor executable instructions stored in the non-transitory computer-readable medium configured to cause the one or more processors to:

receive a plurality of image patches corresponding to an image of a pathology slide having a hematoxylin and eosin-stained ("H&E") stained sample of tissue, each image patch representing a different portion of the image;

for each image patch, determine, using a first trained machine learning ("ML") model, a patch biomarker status;

for each patch biomarker status, compare the respective patch biomarker status to a threshold, responsive to a determination that the respective patch biomarker status for biomarker positivity satisfies the threshold, determine the patch biomarker status as comprising biomarker positive;

responsive to a determination that the respective patch biomarker status for biomarker negativity satisfies the threshold, determine the patch biomarker status as comprising biomarker negative; and determine, using a second trained ML model, a tissue sample biomarker status for the sample of tissue based on the patch biomarker statuses of the image patches.

10. The system of claim 9, wherein:

the patch biomarker status comprises one of estrogen receptor ("ER") positive, ER negative, progesterone receptor ("PR") positive, PR negative, human epidermal growth factor receptor 2 ("HER2") positive, HER2 negative, or not invasive carcinoma, and the tissue sample biomarker status comprises one of ER positive, ER negative, PR positive, PR negative, HER2 positive, HER2 negative, or not invasive carcinoma.

11. The system of claim 9, wherein the patch biomarker status is a first patch biomarker status and the tissue sample biomarker status is a first tissue sample biomarker status, and wherein the one or more processors are configured to execute further processor executable instructions stored in the non-transitory computer-readable medium configured to cause the one or more processors to:

for each image patch, determine, using a third trained ML model, a second patch biomarker status;

determine, using a fourth trained ML model, a second tissue sample biomarker status for the sample of tissue based on the second patch biomarker statuses of the image patches;

for each image patch, determine, using a fifth trained ML model, a third patch biomarker status; and determine, using a sixth trained ML model, a third tissue sample biomarker status for the sample of tissue based on the third patch biomarker statuses of the image patches.

12. The system of claim 11, wherein:

the first patch biomarker status comprises one of estrogen receptor ("ER") positive, ER negative, or not invasive carcinoma, the first tissue sample biomarker status comprises one of ER positive, ER negative, or not invasive carcinoma, the second patch biomarker status comprises one of progesterone receptor ("PR") positive, PR negative, or not invasive carcinoma, the second tissue sample biomarker status comprises one of PR positive, PR negative, or not invasive carcinoma, the third patch biomarker status comprises one of human epidermal growth factor receptor 2 ("HER2") positive, HER2 negative, or not invasive carcinoma, the third tissue sample biomarker status comprises one of HER2 positive, HER2 negative, or not invasive carcinoma.

13. The system of claim 9, wherein the one or more processors are configured to execute further processor executable instructions stored in the non-transitory computer-readable medium configured to cause the one or more processors to generate a histogram based on the patch biomarker statuses of the image patches, and determine, using the second trained ML model, the tissue sample biomarker status for the sample of tissue based on the histogram.

14. The system of claim 9, wherein each patch biomarker status comprises a probability between 0% and 100%, inclusive.

15. The system of claim 9, wherein the tissue sample biomarker status for the sample of tissue comprises a probability between 0% and 100%, inclusive.

16. The system of claim 9, wherein the threshold is t; and wherein the one or more processors are configured to execute further processor executable instructions stored in the non-transitory computer-readable medium configured to cause the one or more processors to:

responsive to a determination that a respective patch biomarker status for biomarker positivity is greater than or equal to t, determine the patch biomarker status as comprising biomarker positive;

responsive to a determination a respective patch biomarker status for biomarker negativity is greater than or equal to t, determine the patch biomarker status as comprising biomarker negative; and responsive to a determination that a respective patch biomarker status for biomarker positivity is less than t and that the respective patch biomarker status for biomarker negativity is less than t, determine the patch biomarker status as comprising not invasive carcinoma.

17. A non-transitory computer-readable medium comprising processor-executable instructions configured to cause a processor to:

receive a plurality of image patches corresponding to an image of a pathology slide having a hematoxylin and eosin-stained ("H&E") stained sample of tissue, each image patch representing a different portion of the image;

for each image patch, determine, using a first trained machine learning ("ML") model, a patch biomarker status;

for each patch biomarker status, compare the respective patch biomarker status to a threshold, responsive to a determination that the respective patch biomarker status for biomarker positivity satisfies the threshold, determine the patch biomarker status as comprising biomarker positive;

responsive to a determination that the respective patch biomarker status for biomarker negativity satisfies the threshold, determine the patch biomarker status as comprising biomarker negative; and determine, using a second trained ML model, a tissue sample biomarker status for the sample of tissue based on the patch biomarker statuses of the image patches.

18. The non-transitory computer-readable medium of claim 17, wherein:

the patch biomarker status comprises one of estrogen receptor ("ER") positive, ER negative, progesterone receptor ("PR") positive, PR negative, human epidermal growth factor receptor 2 ("HER2") positive, HER2 negative, or not invasive carcinoma, and the tissue sample biomarker status comprises one of ER positive, ER negative, PR positive, PR negative, HER2 positive, HER2 negative, or not invasive carcinoma.

19. The non-transitory computer-readable medium of claim 17, wherein the patch biomarker status is a first patch biomarker status and the tissue sample biomarker status is a first tissue sample biomarker status, and further comprising processor-executable instructions configured to cause the processor to:

for each image patch, determine, using a third trained ML model, a second patch biomarker status;

determine, using a fourth trained ML model, a second tissue sample biomarker status for the sample of tissue based on the second patch biomarker statuses of the image patches;

for each image patch, determine, using a fifth trained ML model, a third patch biomarker status; and determine, using a sixth trained ML model, a third tissue sample biomarker status for the sample of tissue based on the third patch biomarker statuses of the image patches.

20. The non-transitory computer-readable medium of claim 19, wherein:

the first patch biomarker status comprises one of estrogen receptor ("ER") positive, ER negative, or not invasive carcinoma, the first tissue sample biomarker status comprises one of ER positive, ER negative, or not invasive carcinoma, the second patch biomarker status comprises one of progesterone receptor ("PR") positive, PR negative, or not invasive carcinoma, the second tissue sample biomarker status comprises one of PR positive, PR negative, or not invasive carcinoma, the third patch biomarker status comprises one of human epidermal growth factor receptor 2 ("HER2") positive, HER2 negative, or not invasive carcinoma, the third tissue sample biomarker status comprises one of HER2 positive, HER2 negative, or not invasive carcinoma.

\* \* \* \* \*